United States Patent
Wiemer et al.

(10) Patent No.: US 10,948,988 B1
(45) Date of Patent: Mar. 16, 2021

(54) CONTEXTUAL AWARENESS BASED ON EYE MOTION TRACKING BY AN EYE-MOUNTED SYSTEM

(71) Applicant: Tectus Corporation, Saratoga, CA (US)

(72) Inventors: Michael West Wiemer, San Jose, CA (US); Ramin Mirjalili, San Jose, CA (US); Joseph Czompo, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 16/565,029

(22) Filed: Sep. 9, 2019

(51) Int. Cl.
| | |
|---|---|
| G09G 5/00 | (2006.01) |
| G06F 3/01 | (2006.01) |
| G06K 9/00 | (2006.01) |
| H04N 5/232 | (2006.01) |
| G08B 7/06 | (2006.01) |
| G02C 11/00 | (2006.01) |
| H04N 5/225 | (2006.01) |
| G02C 7/04 | (2006.01) |

(52) U.S. Cl.
CPC .............. *G06F 3/013* (2013.01); *G02C 11/10* (2013.01); *G06K 9/00288* (2013.01); *G06K 9/00335* (2013.01); *G08B 7/06* (2013.01); *H04N 5/2257* (2013.01); *H04N 5/23203* (2013.01); *G02C 7/04* (2013.01)

(58) Field of Classification Search
None
See application file for complete search history.

(56) References Cited

U.S. PATENT DOCUMENTS

| | | | | |
|---|---|---|---|---|
| 8,577,292 | B2 | 11/2013 | Huibers | |
| 2012/0249797 | A1* | 10/2012 | Haddick | G02B 27/0172 348/158 |
| 2013/0054576 | A1* | 2/2013 | Karmarkar | G06F 3/013 707/722 |
| 2014/0096077 | A1* | 4/2014 | Jacob | G06F 3/013 715/810 |
| 2015/0058123 | A1* | 2/2015 | Lenahan | E05B 47/00 705/14.58 |

(Continued)

OTHER PUBLICATIONS

Chuk, et al., "Understanding eye movements in face recognition using hidden Markov models," Journal of Vision (2014) 14(11):8, pp. 1-14.

(Continued)

*Primary Examiner* — Kirk W Hermann
(74) *Attorney, Agent, or Firm* — Fenwick & West LLP

(57) ABSTRACT

Humans may exhibit characteristic patterns of eye movements when looking at specific objects. For example, when a person looks at the face of another person, their eyes exhibit a certain pattern of movements and saccades as they look at the face. An electronic contact lens includes eye tracking sensors and an outward looking imaging system that may capture images of the user's environment. When the eye tracking sensors detect the pattern of eye movements characteristic of looking at a face, the imaging system becomes active and captures images and performs facial recognition to identify the face using the captured images. The results of the facial recognition may be displayed to the user using a projector of the electronic contact lens.

20 Claims, 9 Drawing Sheets

(56) References Cited

U.S. PATENT DOCUMENTS

| | | | |
|---|---|---|---|
| 2015/0070262 A1* | 3/2015 | Peters | G06F 3/013 |
| | | | 345/156 |
| 2016/0080672 A1* | 3/2016 | Braun | G06F 3/013 |
| | | | 348/333.01 |
| 2016/0132726 A1* | 5/2016 | Kempinski | A61B 3/113 |
| | | | 382/117 |
| 2017/0103472 A1* | 4/2017 | Shah | G06K 9/00597 |
| 2017/0123492 A1 | 5/2017 | Marggraff | |
| 2018/0149884 A1* | 5/2018 | Miller | G02B 27/017 |
| 2018/0197336 A1* | 7/2018 | Rochford | G02B 27/0172 |
| 2019/0332168 A1* | 10/2019 | Weldemariam | A61B 5/6821 |

OTHER PUBLICATIONS

Hsiao, et al., "Two Fixations Suffice in Face Recognition," Psychological Science, Univ. of California, San Diego, 2008, vol. 19, No. 10, pp. 998-1006.

Hsiao, Janet H., "Eye Movements in Face Recognition," Univ. of Hong Kong, Hong Kong, (date unknown), pp. 255-272.

Noton, et al., "Eye Movements and Visual Perception," Scientific American, Jun. 1971, pp. 34-43.

Yarbus, Alfred, "Eye Movements and Vision," Plenum Press, New York, 1967, 121 pages.

\* cited by examiner

CONTEXTUAL AWARENESS BASED ON EYE MOTION TRACKING BY AN EYE-MOUNTED SYSTEM

BACKGROUND

1. Technical Field

This invention generally relates to eye tracking, and in particular context-based functionality based upon eye tracking.

2. Description of Related Art

Contact lenses that provide refractive vision correction are commonplace. Recently, there has been increased interest in contact lenses that perform functions other than just vision correction. In many of these applications, a contact lens may carry a payload for performing various functions. For example, a contact lens may contain a payload of one or more electrical components, such as projectors, imaging devices, sensors, coils, batteries, MEMS (micro-electromechanical systems), accelerometers, magnetometers, gyroscopes, etc. These contact lenses may be referred to as electronic contact lenses.

One type of electronic contact lens is an eye-mounted display comprising a tiny projector mounted inside a contact lens. The projector projects images onto the retina of a person wearing the contact lens. Eye-mounted displays can be used for virtual reality applications and also for augmented reality applications. In virtual reality applications, the images projected by the eye-mounted display replace the user's view of his external environment. In augmented reality applications, the images projected by the eye-mounted display augment the user's view of his external environment. For example, the projected images may appear superimposed on the user's external environment. In some applications, eye tracking components can be used to track the position and/or orientation of the eye, where the estimated position of the eye can be used to perform various functions.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

Figure 1:
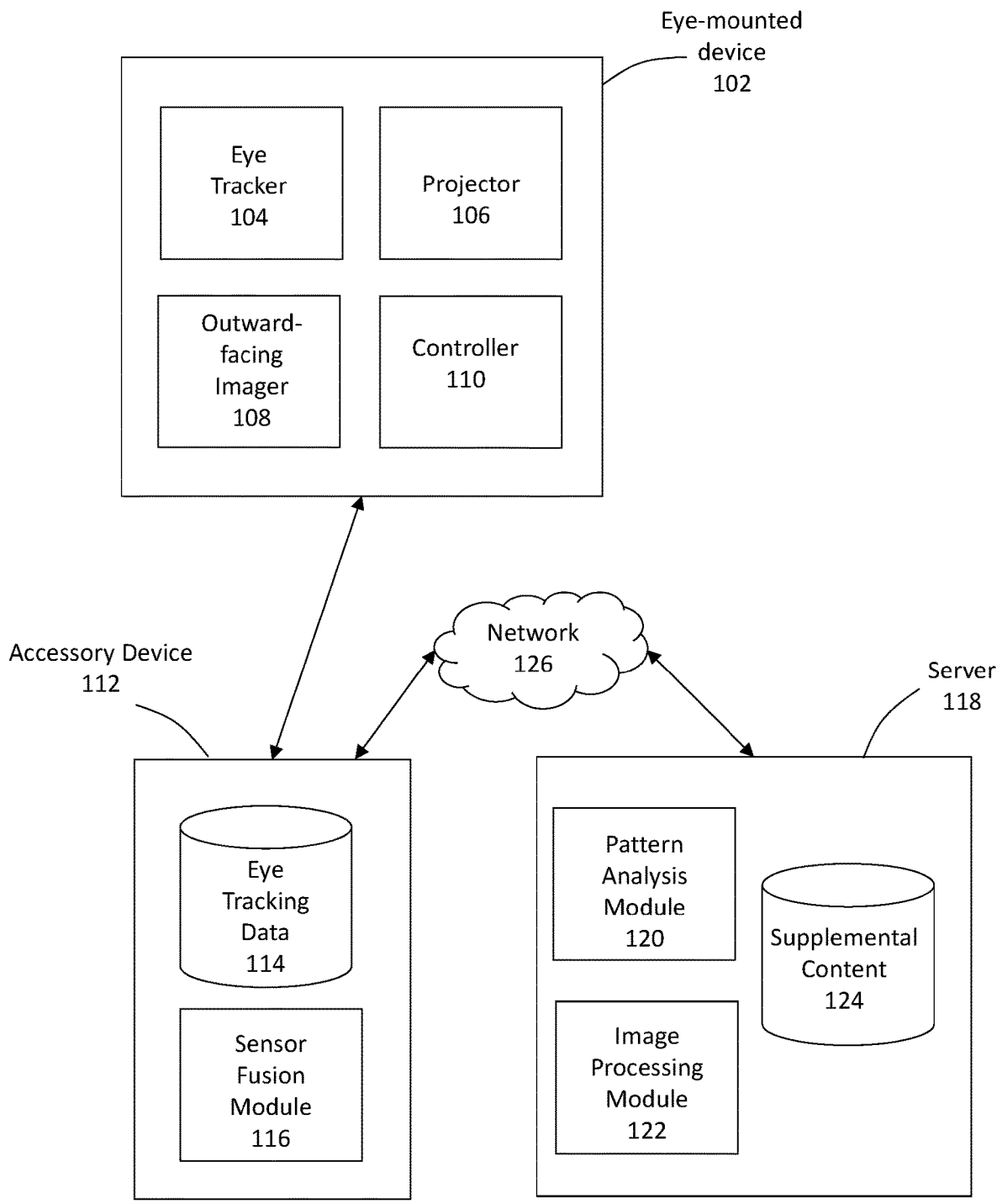
FIG. 1 shows a block diagram of an eye-mounted system that takes actions based upon eye movements, in accordance with some embodiments.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

An electronic contact lens contains sensors that generate measurements from which movement of a user's eye can be estimated. Certain patterns of eye movement may be used to infer the user's context, such as what the user is looking at or the overall setting in which the user is located or possible motion that the user plans to make. When these patterns are detected, actions appropriate for the user's context may then be taken.

Humans may exhibit characteristic patterns of eye movements when looking at specific objects. For example, one's eyes exhibit a characteristic pattern of saccades when looking at another person's face. The pattern is distinct compared to eye movement patterns that occur when one looks at an object that is not a face, such as a tree or a doorway. When these characteristic eye movements are detected, appropriate actions may be taken.

As an example, consider an electronic contact lens that includes eye tracking sensors and an outward looking imaging system that can capture images of the user's environment. Image capture and image processing may consume a large amount of power and data bandwidth, both of which are at a premium on an electronic contact lens. As a result, the imaging system may normally be turned off or operated in a low power mode. When the eye tracking sensors detect the pattern of eye movements characteristic of looking at a face, the imaging system may become active and capture images. Other actions may also be taken, for example face recognition to identify the faces.

In some embodiments, the electronic contact lens may include a "femtoprojector," which is a small projector that projects images onto the user's retina. Based on which patterns are detected, the system may change the content projected onto the user's retina.

By recognizing that certain types of motions may be indicative of the user looking at certain types of objects, tracked eye motions can be used as a "fingerprint" for identifying a type of object that the user is looking at. In some embodiments, eye movement patterns are associated with context, wherein each context may correspond to a type of object that the user is looking at, a type of function able to be performed using the electronic contact lens, or some combination thereof. When a user's tracked eye movements are determined to match a known eye movement pattern, a context of the user can thus be inferred. In response, the electronic contact lens may be used to perform certain functions based upon the inferred context (e.g., where the context corresponds to a certain type of object being viewed by the user, the performed functions may be responsive to the presence of objects of that type in the user's vicinity).

Overall System

FIG. 1 shows a block diagram of an eye-mounted system that takes actions based upon context inferred from eye movements, in accordance with some embodiments. The eye-mounted system 100 comprises an eye-mounted device 102, an accessory device 112, and a server 118. In some embodiments, the eye-mounted device 102 is an electronic contact lens worn on eye of a user (e.g., an electronic scleral contact lens). In an eye-mounted device 102, the space for electrical components is at a premium. As such, many processing functions of the eye-mounted system may be performed on other components, such as the accessory device 112 and/or the server 118. The accessory device 112 may correspond to a device associated with the user able to communicate with the eye-mounted device 102 (e.g., via a transceiver (not shown) to transmit and receive data from the eye-mounted device 102). For example, in some embodiments, the accessory device 112 may be a wearable device such as a headband, a necklace, and/or the like. In other embodiments, the accessory device 112 corresponds to a mobile device in proximity to the user (e.g., a smartphone). The accessory device 112 is further configured to communicate with the server 118 via a network 126 (e.g., using a cellular network, Wi-Fi, etc.). The server 118 corresponds to a remote server able to communicate with the accessory device 112. In some embodiments, the server 118 may be a cloud-based server.

In this example, the eye-mounted device 102 comprises an eye tracker 104, projector(s) 106, an outward-facing imager 108 and a controller 110. The eye tracker 104 comprises a plurality of sensors mounted on or embedded within the eye-mounted device 102 configured to generate measurements usable to estimate a position and/or orientation of the user's eye. As used herein, the term eye position may refer a position of the user's eye, an orientation of the user's eye, or any combination thereof, and may be measured relative to the earth (or a reference point in a local area of the user), relative to the user's head, or some combination thereof. In some embodiments, the eye tracker 104 comprises one or more accelerometers, gyroscopes, and/or a magnetometer for generating measurement values for estimating a position of the user's eye over time. In some embodiments, an imager (e.g., the imager 108) may be used as a motion sensor by capturing images of the external environment over time, wherein motion can be estimated based upon differences between images captured at different points in time. Examples of eye tracking techniques that may be used by the eye tracker 104 to determine the user's eye position are described in U.S. patent application Ser. No. 16/005,379, titled "Contact Lens-Based Eye Tracking," which is hereby incorporated by reference in its entirety.

The projector 106 may correspond to a femtoprojector within the eye-mounted device 102, and is configured to project images onto user's eye. In some embodiments, the images are overlaid on the user's field of view, and augment the user's view of the external environment. For example, the projected images may appear superimposed on the user's external environment. In some embodiments, the images comprise supplemental content determined based upon detected objects in the external environment, such as names of identified individuals in the external environment, translations of text identified in the external environment, and/or the like. In some embodiments, the projector 106 comprises multiple projectors. As used herein, references to the projector 106 may refer to a single projector or multiple projectors.

The outward-facing imager 108 is configured to capture images of the external environment, corresponding to at least a portion of the user's field of view. As such, in some embodiments, the outward-facing imager 108 may be used to capture an image of what the user is currently looking at. In some embodiments, the captured images may be used by an image processing module (e.g., the image processing module 122 on the server 118) to generate supplemental content to be presented to the user (e.g., using the projector 106). For example, in some embodiments, an image captured by the outward-facing imager 108 may contain an image of a face, wherein the image processing module 122 may extract the face from the captured image and perform facial recognition to determine an identity of the face. The determined identity may be used to generate supplemental content to be displayed to the user (e.g., text indicating the identity superimposed on the user's field of view).

The outward-facing imager 108 may consume a large amount of power when capturing images. In addition, transmitting captured images to the accessory device 112 and/or the server 118 may consume a large amount of data bandwidth. In some embodiments, to save on power and data bandwidth, the outward-facing imager may be in an "off" mode or low-power state in which it does not capture images of the external environment or does so at a reduced rate and/or resolution, and turned on or switched to a high-power state only in certain contexts. In some embodiments, certain contexts of the eye-mounted system may be inferred based upon the user's eye movements (e.g., a context being inferred based upon determination that the user's eye has moved along a path matching a predetermined eye movement pattern), which will be described in greater detail below.

The controller 110 is configured to manage the operations of the various components of the eye-mounted device 102 (e.g., the eye tracker 104, projector 106, and the outward-facing imager 108), and manages communication with accessory device 112. For example, in some embodiments, the controller 110 transmits captured images and eye tracking data from the outward-facing imager 108 and eye tracker 104 to the accessory device 112 and/or the server 118 for further processing, and sends instructions to the outward-facing imager 108 and/or the projector 106 based upon processing results received from the accessory device 112 and/or the server 118.

The accessory device 112 may correspond to any type of electronic device associated with the user and able to communicate with the eye-mounted device 102, such as an electronic wearable device (e.g., necklace, headband, waistband, etc.), smartphone, smart-watch, and/or the like. In some embodiments, as the accessory device 112 may not be subject to the same physical restrictions as the eye-mounted device 102, the accessory device 112 may be used to perform processing that would be unsuitable for being performed on the eye-mounted device 102. In some embodiments, the accessory device 112 is further configured to communicate with the server 118, which may be used to perform additional processing functions and analysis.

The accessory device 112 comprises eye tracking data 114 and a sensor fusion module 116. The eye tracking data 114 comprises a data store that stores a record of eye tracking data (e.g., estimated eye positions, or raw sensor data such as accelerations measured by an accelerometer of the eye tracker 104 usable to estimate eye positions) generated by the eye tracker 104 over time. In some embodiments, the accessory device 112 receives raw sensor readings from the eye tracker 104, and processes the received sensor readings to generate an eye position of the user. Each eye position may be associated with a corresponding time. By analyzing the position of the user's eye over time, motion of the user's eye may be determined. In some embodiments, how the user's eye moves over time may be used to define an eye movement path for the user.

The sensor fusion module 116 is configured to cross-reference eye position information with additional information. For example, in some embodiments, the user's eye position may be cross-referenced with additional sensor data indicating the user's location (e.g., determined using a GPS device), whether the user's head is moving, etc. In some embodiments, the additional information may comprise a current operational state of the eye-mounted system 100 (e.g., which functionalities are currently active or inactive in the eye-mounted system 100). In some embodiments, cross-referencing eye position information and/or eye movement information with additional data may be used to determine a context of the user.

The server 118 may be a remote server (e.g., a cloud server) that is accessible by the accessory device 112 through the network 126. In some embodiments, the server 118 may be used to performing processing functions requiring additional data not available to the accessory device. For example, in some embodiments the server 118 may perform facial recognition on received images by accessing a facial database. Although FIG. 1 illustrates the server 118 in communication with one accessory device and eye-mounted device, in some embodiments, the server 118 may communicate with multiple accessory devices 112 and eye-mounted devices 102. For example, multiple users may each have an eye-mounted device and accessory device, which may communicate with the same server for performing eye tracking functions, image processing, and/or other functions.

The pattern analysis module 120 is configured to receive eye tracking data collected by accessory device 112, and analyzes the received eye tracking data to identify one or more patterns. The eye tracking data may comprise determined eye positions over time, or may comprise raw sensor data (e.g., acceleration information) usable by the pattern analysis module 120 or other component of the server 118 for determining eye positions over time. In some embodiments, the pattern analysis module 120 analyzes an eye movement path of the user's eye within a particular time period (e.g., a most recent period of time), and attempts to match the analyzed eye movement path with a pattern of a set of predetermined eye movement patterns. Each predetermined eye movement pattern may be associated with at least one corresponding context. For example, the set of eye movement patterns may include one or more eye movement patterns associated with the viewing of certain objects (e.g., faces, text, etc.) and/or functions to be performed in response to the detection of the pattern (e.g., facial recognition functions). In some embodiments, the server 118, in response to the determining that an analyzed eye movement of the user matches a predetermined pattern associated with a context, notifies the accessory device 112 to cause the eye-mounted device 102 to perform one or more functions associated with the context (e.g., turn on the outward-facing imager 108 to capture one or more images). In some embodiments, the identified eye movement pattern is combined with additional information associated with the user to determine the context of the user.

The image processing module 122 receives images from imager 108 (e.g., via the accessory device 112), and processes the received images based upon a determined context (e.g., facial recognition context, text recognition context, etc.). For example, the image processing module 122 may, in response to a determination by the pattern analysis module 120 that the user's eye movements match a pattern associated with facial recognition, may perform facial recognition on the received image.

The supplemental content 124 comprises content that may be generated or identified based upon the determined context of the user. In some embodiments, the supplemental content 124 is generated or identified based upon the results of image processing by the image processing module 122. For example, if the image processing module 122 performed facial recognition on a captured image, the supplemental content may comprise a name of identified person captured using facial recognition. If the image processing module 122 performed text identification on a received image, the supplemental content may comprise a translation of the identified text or oration of the identified text. In some embodiments, the server 118 transmits the supplemental content to the server 112 to be presented to the user (e.g., using the projector 106 of the eye-mounted device 102).

Thus, by tracking the eye position of the user using the eye tracker 104, the eye-mounted system may match the eye movements of the user with one or more predetermined patterns to determine a context for the user, and perform specific functions associated with the context (e.g., capture an image using the outward-facing imager 108, process the captured image, and provide supplemental data based upon the processed image). This allows for certain functionalities of the eye-mounted system 100, such as image capture using the outward-facing imager 108, to be turned off or kept in a low power state, and turned on only when needed in certain contexts.

Although FIG. 1 illustrates a particular arrangement of components of the eye-mounted system 100, it is understood at in other embodiments, the illustrated components may be arranged differently, and different functions may be performed on different components of the eye-mounted system 100. For example, in some embodiments, the eye-mounted device 102 may be configured to be able communicate directly with the server 118. In some embodiments, one or more pattern analysis and/or image processing functions may be performed on the accessory device instead of the server, or on the contact lens itself (subject to any power and/or processing limitations of the accessory device and contact lens).

Figure 2A:
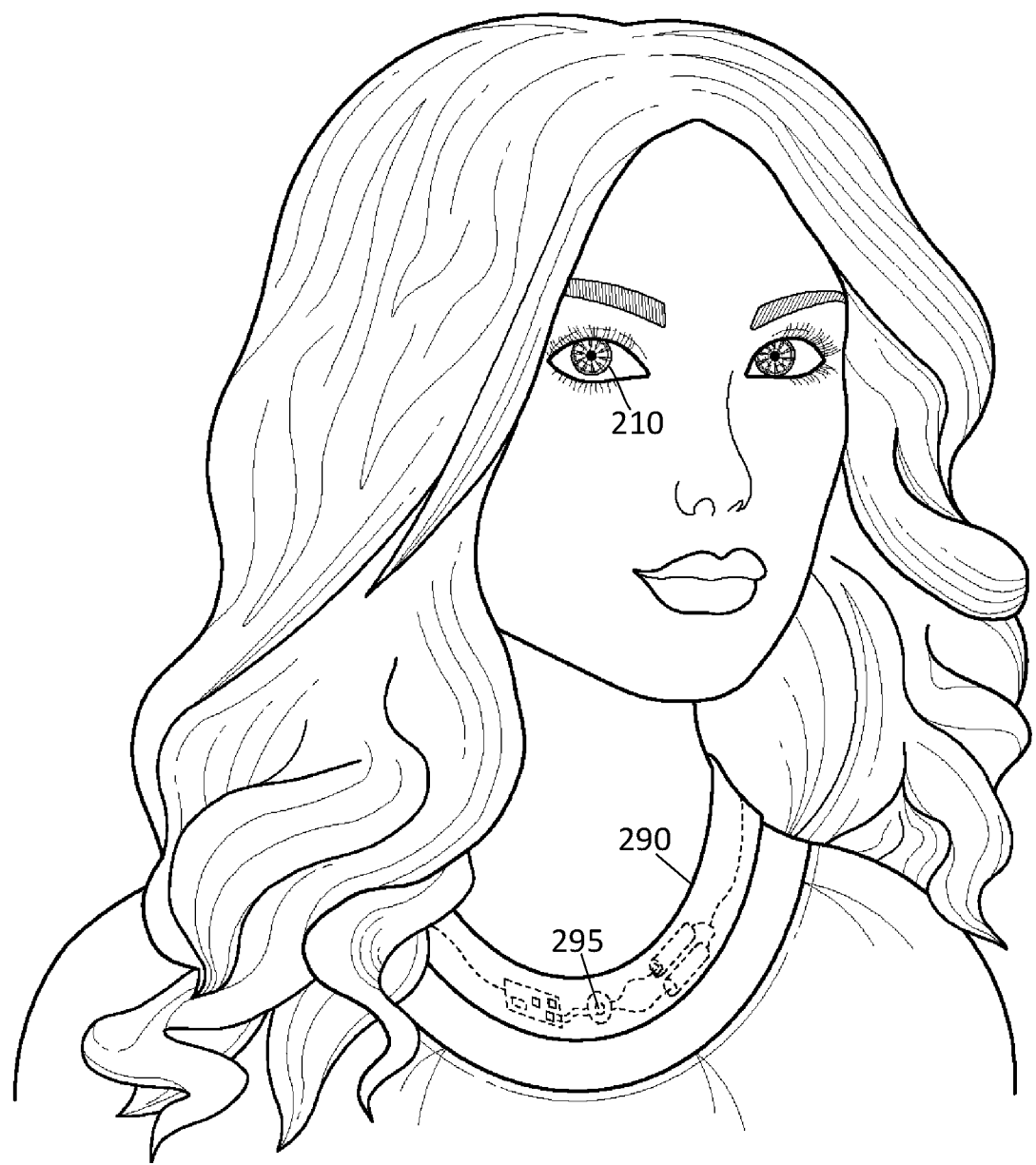
FIG. 2A shows a user wearing an eye-mounted device in communication with an auxiliary necklace, in accordance with some embodiments.

FIG. 2A shows a user wearing an eye-mounted device in communication with an auxiliary necklace, in accordance with some embodiments. The user of FIG. 2A is wearing an electronic contact lens 210, which may correspond to the eye-mounted device 102 of FIG. 1. In some embodiments, the electronic contact lens 210 is a scleral contact lens. In some embodiments, the electronic contact lens 210 may be worn over one eye of the user, while in other embodiments, the user may have an electronic contact lens over each eye. More detailed views of the structure of the electronic contact lens 210 and how it may be worn over the user's eye are illustrated in FIGS. 2B and 2C.

In the embodiment illustrated in FIG. 2A, in addition to the electronic contact lens 210, the user is also wearing an accessory device (e.g., corresponding to the accessory device 112 illustrated in FIG. 1) in the form of a necklace 290 that contains components of the eye-mounted display system. In this example, the necklace 290 includes a wireless transmitter 295 that transmits image data and/or power to the electronic contact lens 210. Image transmission to an electronic contact lens is subject to data rate constraints due to size and power consumption limitations of electronics in a contact lens.

The electronic contact lens 210 may also contain components for data transmission and/or power. Data transmission components may include antennae or optical/infrared photodetectors, data storage and buffering, controls, and/or on-lens processing components. Power components may include coils for power transmission and batteries for power storage. Portions of these subsystems may be external to the user, while other portions may be worn by the user in the form of a headpiece or glasses. Components may also be worn on a belt, armband, wrist piece, necklace or other types of packs.

Figure 2B:
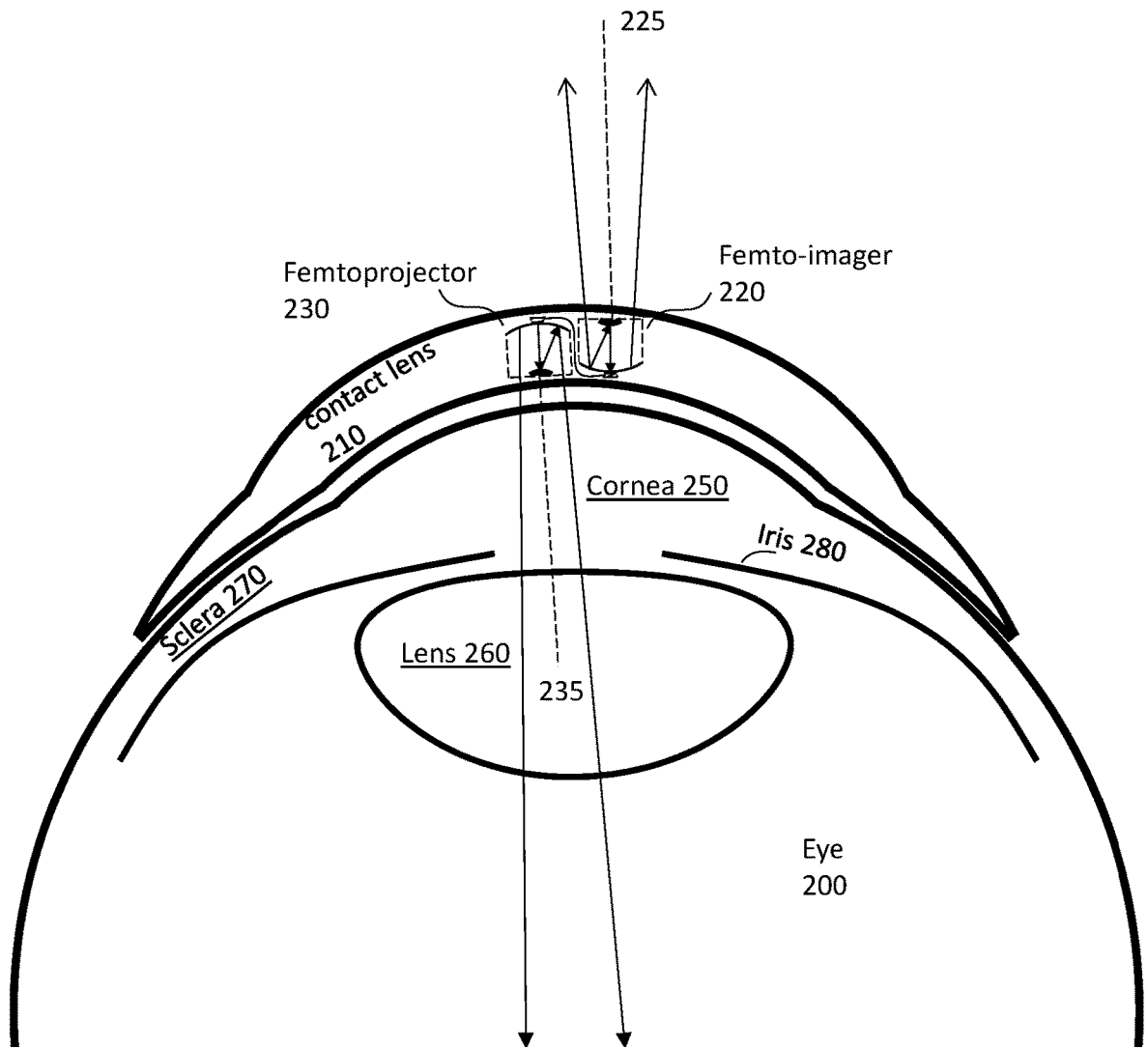
FIG. 2B shows a magnified view of the eye-mounted device mounted on the user's eye, in accordance with some embodiments.
Figure 2C:
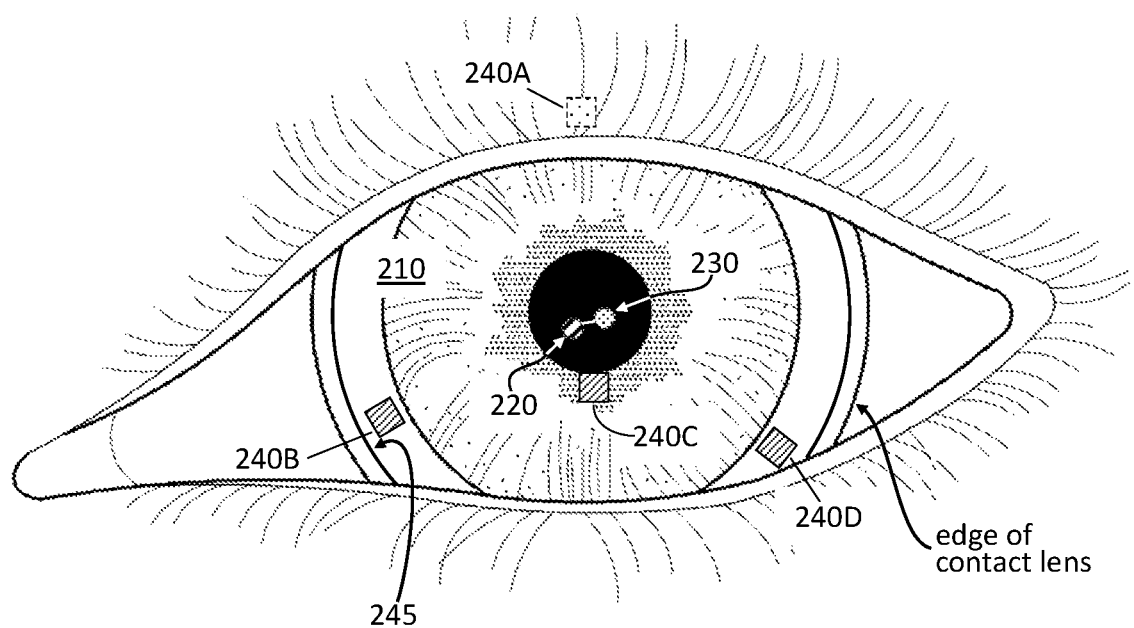
FIG. 2C shows a front view of the eye-mounted device mounted on the user's eye, in accordance with some embodiments.

FIG. 2B shows a magnified cross-sectional view of the eye-mounted device mounted on the user's eye, in accordance with some embodiments. FIG. 2B shows an embodiment using a scleral contact lens but the contact lens 210 does not have to be scleral. The contact lens 210 contains embedded electronics, including an embedded imager 220 (femtoimager) and an embedded femtoprojector 230. The femtoimager 220 and the femtoprojector 230 may correspond to the outward-facing imager 108 and the projector 106 illustrated in FIG. 1, respectively.

In some embodiments, the contact lens 210 preferably has a thickness that is less than two mm. The femtoimager 220 and femtoprojector 230 may each preferably fit in a 1 mm×1 mm×1 mm volume, or at least within a 2 mm×2 mm×2 mm volume. The contact lens 210 contains structures (not shown) and/or materials to permit oxygen to reach the cornea 150, in order to maintain eye health and ensure user comfort.

For completeness, FIG. 2B shows some of the structure of the eye 200. The contact lens 210 is separated from the cornea 250 of the user's eye 200 by a tear layer. Over the cornea 250, the tear layer may be as thick as a hundred microns or more while it may be only a few microns thick over the sclera 270. The aqueous of the eyeball is located between the cornea and the crystalline lens 260 of the eye 200. The vitreous fills most of the eyeball. The iris 280 limits the aperture of the eye.

The femtoimager 220 is an outward-facing imaging device that "looks" away from the eye 100 and captures imagery of the surrounding environment. The field of view 225 of the femtoimager 220 may be the same, smaller or larger than a field view of the user's eye. In some embodiments, the femtoimager 220 may include imaging optics, a sensor array and sensor circuitry. The sensor array may be an array of photodiodes. In some embodiments, the sensor array operates in a visible wavelength band (i.e., ~390 nm to 770 nm). Alternatively or additionally, the sensor array operates in a non-visible wavelength band, such as an infrared (IR) band (i.e., ~750 nm to 10 μm) or an ultraviolet band (i.e., <390 nm). For example, the sensor array may be a thermal infrared sensor.

The sensor circuitry senses and conditions sensor signals produced by the sensor array. In some instances, the output signals produced by the sensor circuitry are analog signals. Alternatively, the sensor circuitry may include analog-to-digital converters (ADC), so that the output signals are digital rather than analog. The sensor circuitry may also have other functions. For example, the sensor circuitry may amplify the sensor signals, convert them from current to voltage signals or filter noise from the sensor signals to keep a signal-to-noise ratio above a threshold value. The sensor circuitry may be implemented as a separate electronics module within the contact lens 210. Alternatively, it may be implemented as a backplane to the sensor array. In some cases, processing of the images captured by the femtoimager occurs outside the contact lens 210. For example, in some embodiments, image data captured by femtoimager 220 may be transmitted to the necklace 290 (e.g., via the wireless transmitter 295) for analysis or processing.

The femtoprojector 230 is a projector configured to project images onto a user's retina. Examples of femtoprojectors are described by Deering in U.S. Pat. No. 8,786,675, "Systems using eye mounted displays," incorporated herein by reference. As used herein, a "femtoprojector" may refer to a projector that is very small in size, e.g., typically no larger than about a millimeter in any dimension. A femtoprojector includes an image source and an optical system. The image source may be a display chip such as an array of light-emitting pixels. A light emitting diode (LED) array is an example of a display chip. The optical system focuses light from the image source onto the retina. As such, the femtoprojector is able to project images onto the wearer's retina, thus superimposing virtual objects onto the field of view of the wearer. As such, when a person is wearing the contact lens display, he may see an augmented reality.

FIG. 2C shows a front view of the eye-mounted device mounted on the user's eye, in accordance with some embodiments. The contact lens 210 is placed on the surface of the eye 200. The contact lens 210 moves with the user's eye 200 as the user's eye rotates in its socket. Because the femtoimager 220 and the femtoprojector 230 are mounted in the contact lens 210, they also move with the user's eye. As such, the positions of the femtoimager 220 and the femtoprojector 230 relative to the user's eye 200 may remain constant as the eye 200 moves. Although FIG. 2C illustrates the femtoimager 220 as being near the center of the contact lens 210, it is understood that in some embodiments, the femtoimager 220 may be positioned closer to an edge of the contact lens 210, so as to reduce an amount of light blocked from reaching the user's retina via the pupil.

In some embodiments, the ratio of the contact lens diameter to the lateral size of each of the femtoimager and femtoprojector is preferably roughly 15:1. This ratio is normally between about 15:1 and 30:1, but may be as small as 5:1 or smaller or as large as 50:1 or larger.

The contact lens 210 also contains a network of accelerometers 240. In this example, there are four 3-axis accelerometers 240A-D, each represented by a small square. The outlined square 240A is in a portion of the contact lens that is covered by the user's eyelid in FIG. 2C. The hatched squares 240B-D are accelerometers that are directly visible. This accelerometer network measures accelerations of various points along various directions. These measurements may be processed to estimate eye position. In addition, in some embodiments, the contact lens 210 may contain other types of sensors (e.g., magnetometers, gyroscopic sensors, etc.) that may be used determine a position of the user's eye.

The human eye moves often. For example, as a user views a scene, their eyes move rapidly between a number of different fixation points, allowing for the user to take in the scene around them. These rapid movements of the eye between different fixation points are referred to as saccades. Almost all saccades performed by the user are done unconsciously as the user fixates on various objects within the scene. For example, when a user is viewing an object, their eyes may saccade to various points of fixation based upon the object.

By tracking a user's eye position at different points in time, motion of the user's eye may be determined. Recognizing that certain types of motions may be indicative of the user looking at certain types of objects, tracked eye motions may thus be used as a "fingerprint" for identifying a type of object that the user is looking at. Because these eye movements are performed unconsciously by the user as they view different objects, they may be consistent for each user whenever they are looking at objects of a particular type. In some embodiments, a recognized eye movement pattern may be associated with a context corresponding to certain types of functionalities that may be performed using the eye-mounted device (e.g., image processing, presenting supplemental data, etc.).

Process Flow

Figure 3:
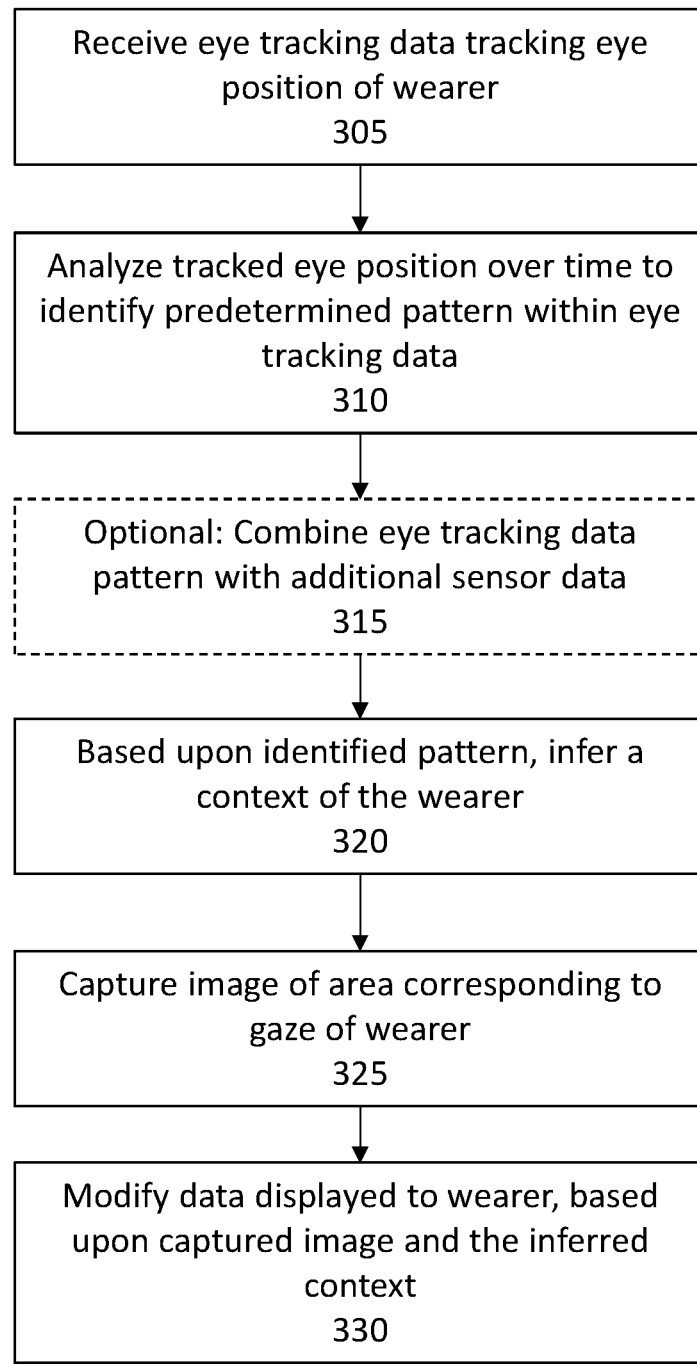
FIG. 3 is a flowchart of a process for determining context based upon eye tracking data, in accordance with some embodiments.

FIG. 3 is a flowchart of a process for determining context based upon eye tracking data, in accordance with some embodiments. In some embodiments, the process illustrated in FIG. 3 is performed by the eye-mounted system 100 illustrated in FIG. 1.

The eye-mounted system receives 305 eye tracking data of the user, indicating eye position of at least one eye of the user over time. In some embodiments, the eye tracking data is determined using one or more sensors on an eye-mounted device (e.g., an electronic contact lens) worn by the user. For example, the eye-mounted device may contain one or more accelerometers, magnetometers, gyroscopic sensors, or some combination thereof configured to generate a plurality of sensor readings over time. The sensor readings may be analyzed to estimate a current eye position of the user.

The eye-mounted system analyzes 310 tracked eye position over time to identify eye movements matching one or more predetermined patterns. In some embodiments, the server of the eye-mounted system maintains a record of eye tracking data based upon sensor readings received from the eye-mounted device. As additional eye tracking data is received over time, the server performs pattern recognition on eye tracking data received within one or more time periods (e.g., eye tracking data received within a predetermined threshold time period up to the current time). For example, the server may compare an eye movement path within an analyzed time period to one or more predetermined patterns to determine a level of similarity to the pattern, wherein the analyzed eye movement path is identified as matching the pattern if the level of similarity exceeds a threshold value.

In some embodiments, the eye-mounted system optionally combines 315 the eye tracking data with data from other sensors. For example, the eye tracking data may be cross-referenced with GPS data to estimate a location of the user when a detected eye pattern of interest occurred. This may be done to identify particular objects the user may be looking at, based upon the detected eye movement pattern and the location data. In some embodiments, the eye tracking data includes or is combined with sensor data indicating movement of the user's head. In some embodiments, the eye tracking data is combined with data indicating a current state of the system. For example, in some embodiments, the user performing an eye movement matching a particular pattern when the eye-mounted system has certain functionalities turned on, may cause a different context to be inferred compared to if the user performs the eye movement matching the pattern when the eye-mounted system has those functionalities turned off.

The eye-mounted system identifies 320 a context based upon identified pattern. In some embodiments, each predetermined pattern is associated with at least one context. For example, a pattern indicative of the user attempting to recognize a face may be associated with a facial recognition context. Each context may correspond to a type of object the user is inferred to be looking at, a type of functionality of the system, or some combination thereof.

Based on context, the eye-mounted system performs one or more subsequent actions associated with the context. In some embodiments, the eye-mounted system captures 325 an image corresponding to a gaze of the user. For example, the server, upon identifying the context, sends an instruction to the eye-mounted device (e.g., via the accessory device) to configure an imager to capture one or more images of the local area corresponding to gaze of user (e.g., turn on the imager, switch the imager to a higher resolution mode, increase an image capture rate of an imager, etc.). The eye-mounted system may then modify 330 data displayed to the user, based upon the captured image and the identified context. In some embodiments, the eye-mounted system analyzes the captured images to generate supplemental data to be displayed to the user (e.g., using the projector of the eye-mounted device). For example, the supplemental data may comprise information associated with an object or content identified in the captured images, targeted advertising based upon one or more objects or content in the captured images, etc. In addition, while in some embodiments, the eye-mounted system performs actions using the eye-mounted device (e.g., displaying supplemental content to the user using the eye-mounted device), in other embodiments, the eye-mounted system may perform actions outside the eye-mounted device, e.g., using devices other than the eye-mounted device (e.g., providing supplemental content in the form of audio content to the user via an earpiece).

As discussed above, eye motion may be used as a "fingerprint" of what the user is looking at, where certain types of eye motion patterns may be indicative of the user looking at certain types of objects. These eye motion patterns are typically performed unconsciously by the user as the user looks at the object, and as such may be used as reliable indicators that the user is looking at that type of object.

In some embodiments, certain functionalities of the eye-mounted system may only be needed in certain contexts. In order to save power, components associated with these functionalities many be turned off when not needed. For examples, functionalities relating to the capture of images using a femtoimager (e.g., the femtoimager 220 illustrated in FIGS. 2B and 2C) and transmitting of captured images to an accessory device or server for analysis may consume a large amount of power. In contrast, tracking the user's eye position over time may consume less power. In some embodiments, by tracking an eye position of the user over time and identifying particular eye movement patterns, more power-consuming functionalities (e.g., image processing, facial recognition, etc.) may be turned on in appropriate contexts, while remaining off otherwise, reducing power consumption of the device.

Facial Recognition Applications

Figure 4:
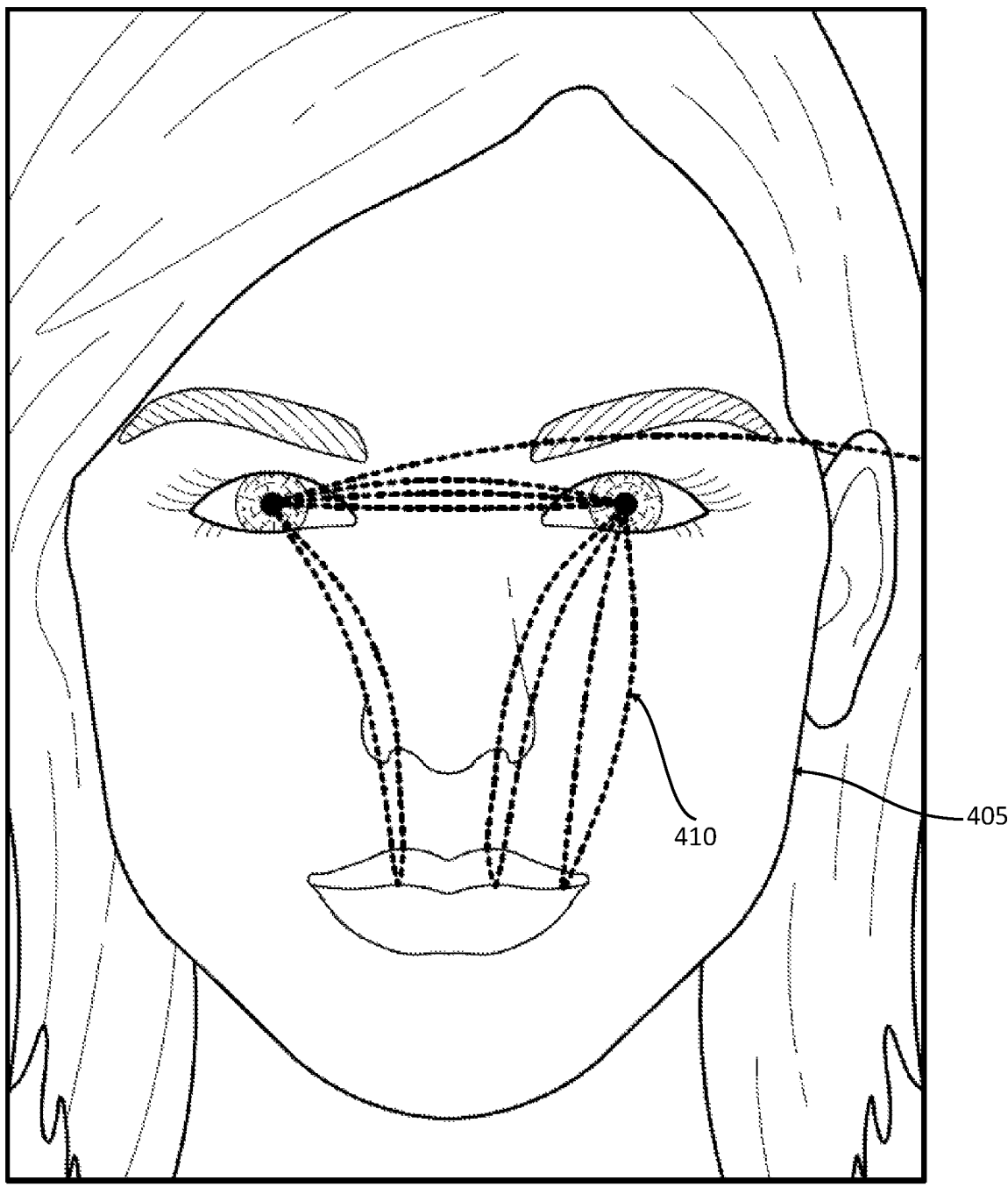
FIG. 4 shows a pattern of eye movements when recognizing a face, in accordance with some embodiments.

In some embodiments, tracked eye movements may be used to determine when to use a facial recognition function of the system. It has been determined that when a user looks at a face, their eyes will typically perform a predictable series of movements (e.g., saccades) as they attempt to recognize the face. FIG. 4 shows a pattern of eye movements when recognizing a face, in accordance with some embodiments. As illustrated in FIG. 4, when a user looks at the face 405, the user's eyes may move in a predictable path 410 as the user attempts to recognize the face. The path 410 of the user's eyes may comprise a series of saccades between a plurality of fixed points on the face 405, corresponding to certain features of the face, such as the eyes, nose, and lips of the face. As these movements are performed unconsciously by the user, the sequence of movements will be relatively constant (with variations based upon the geometry and orientation of the face, area of the face within the user's field of view, etc.) whenever the user looks at a new face, allowing for a recognizable eye movement pattern to be associated with the viewing of faces by the user.

In some embodiments, the eye-mounted device is configured to perform facial recognition of a face being viewed by the user. To do so, the eye mounted device may comprise an imager (e.g., a femtoimager) that captures an image of at least a portion of the user's field of view. The captured image is analyzed (e.g., at an accessory device or server) to identify a face within the captured image, for which facial recognition is performed. In some embodiments, if an identity of the face is determined through facial recognition, the eye-mounted device may be instructed to display to the user (e.g., using a femtoprojector) a name corresponding to the face. In other embodiments, the user may be made aware of the name through other means (e.g., audio content presented to the user via an earpiece).

While FIG. 4 illustrates a particular eye movement pattern associated with facial recognition, there may be slight differences in how different users move their eyes when viewing a face (or other object types). In some embodiments, a calibration procedure may be performed for an individual user, in order to identify an eye movement pattern for the user corresponding to when they are looking at a face. The calibration procedure may comprise showing the user a plurality of faces, and tracking their eye movements when the faces are displayed. In some embodiments, the faces may correspond to images displayed to the user using a display of an external device (e.g., a computer screen), and may be presented over a plurality of different time intervals. In other embodiments, the faces may be displayed to the user using a femtoprojector of the eye-mounted device. The displayed faces may have a variety of different shapes and sizes. The tracked eye movements of the user corresponding to when they are viewing the displayed faces is analyzed to determine an eye movement pattern for the user that is indicative of the user viewing a face. In addition, the system may capture images of the displayed faces from the point of view of the user (e.g., using an outward facing imager of the eye-mounted device), allowing for portions of the eye movement path of the user to be associated with particular points on each displayed face.

In some embodiments, the identified eye movement pattern may not only be used to determine when to turn on the outward-facing imager for performing facial recognition, but may also be used to determine how much of a captured image should be analyzed. For example, while the outward-facing imager may be able to capture an image corresponding to a certain field of view in front of the user, only certain portions of the image may be needed for performing facial recognition (e.g., the portion of the image containing the face to be recognized). As the bandwidth of data that may be transmitted between the eye-mounted device and the accessory device and/or server may be limited, by being able to identify a needed portion of a captured image and transmitting only the needed portion from the eye-mounted device to the accessory device and/or the server for analysis, an amount of data bandwidth needed may be reduced.

Figure 5:
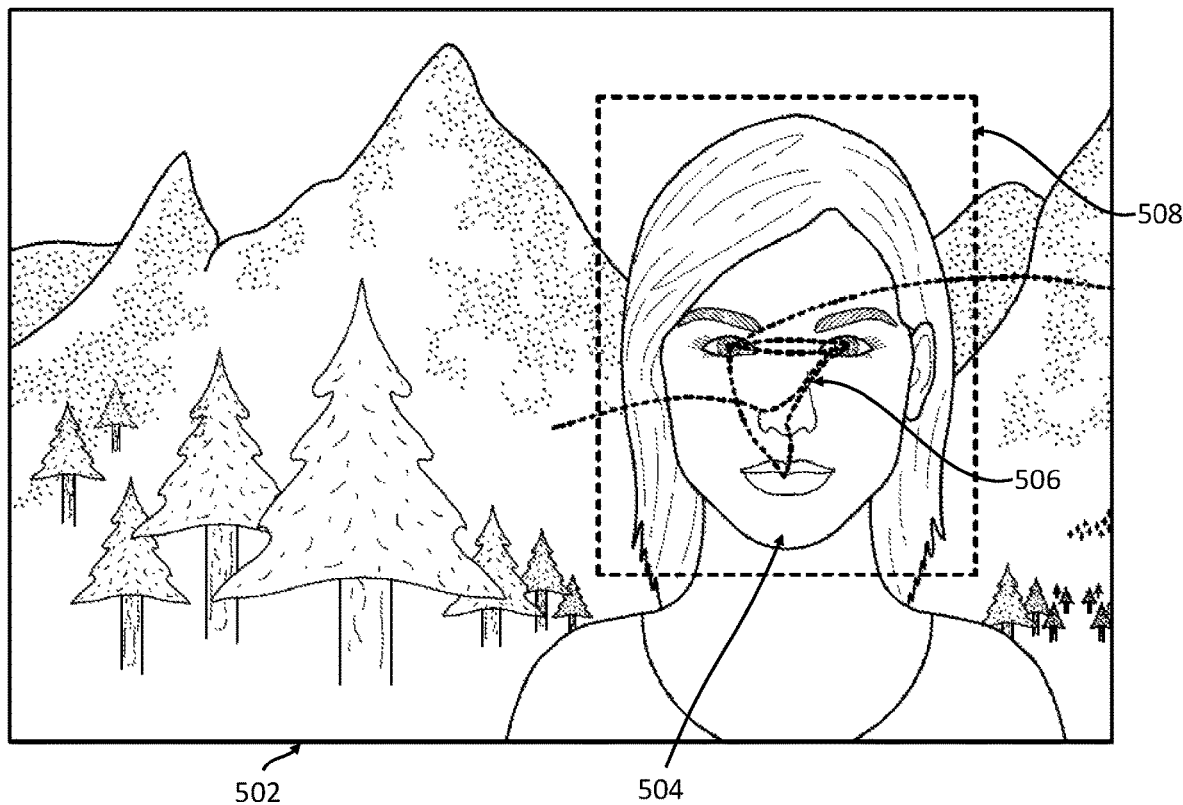
FIG. 5 shows an example of image capture based upon tracked eye movements, in accordance with some embodiments.

FIG. 5 shows an example of image capture based upon tracked eye movements, in accordance with some embodiments. As illustrated in FIG. 4, the eye movements of a user (e.g., eye movement path 410) when viewing a face (e.g., the face 405) may be based upon certain points of fixation on the face, such as the eyes, noses, and lips of the face. However, while the user's eyes may move in accordance with a particular eye movement pattern when the user is looking at a face, a size of the movements (e.g., distance travelled by the user's eyes, or amount of change in orientation of the user's eyes) may vary based upon a size of the face within the user's field of view.

In FIG. 5, an imager (e.g., a femtoimager) captures an image 502 corresponding to at least a portion of the user's field of view. The image 502 may be captured response to determining that the user's eye have performed movements matching a predetermined eye movement pattern associated with a context of facial recognition. As such, the captured image 502 will be expected to contain a face 504 on which facial recognition may be performed.

In some embodiments, the eye movements 506 of the user corresponding to the predetermined eye movement pattern is mapped to a region of the captured image 502. Because the size of the eye movements 506 is based upon fixture points on the face 504 (e.g., eyes, nose, lips, etc.), an amount of the captured image 502 occupied by the face 504 may be inferred based upon a size of the detected pattern. For example, if face 504 is further away from user, the face 504 will be smaller in user's field of view. As such, the eye movement 506 will be smaller in size when mapped to the image 502. The eye movement 506 may be used to determine an expected location of one or more features of the face 504 (e.g., eyes, lips, etc.) within the image 502, and/or determine one or more facial measurements of the face 504 (e.g., inter-eye distance, a distance between the eyes and lips of the face, etc.) on the image 502 (e.g., number of pixels on the image). In some embodiments, the imager is configured to capture low-resolution images when in a low-power state. A region of a captured low-resolution image may be identified as having a face. When a determination is made that the eye movement of the user is indicative of the user viewing a face, the imager may then capture a higher-resolution image of the identified region of the low-resolution image, in order to improve facial recognition.

Using a size of the detected eye movements 506, the eye-mounted device may infer a bounding box 508 corresponding a portion of the image 502 that is expected to enclose the face 504 (e.g., based upon expected ratios between one or more determined facial measurements and an overall size of the face). For purposes of performing facial recognition functions, only image data within the bounding box 508 is analyzed. This may reduce an amount of processing and/or data transmission needed to be performed by the eye-mounted device, potentially further reducing power consumption and/or data bandwidth used.

FIG. 5 illustrates that a portion of a captured image to be analyzed may be determined based upon a size of a detected eye movement path corresponding to an eye movement pattern. In embodiments where other types of eye movement patterns may be used to infer that the user is looking at other types of objects, a size of the detected eye movement paths may also be used to determine one or more parameters of a functionality the eye-mounted device associated with the context.

Textual Transcription and/or Translation Applications

In some embodiments, different types of eye movement patterns may be associated with different contexts and/or with different types of objects that the user is looking at. As the user's eye movement is tracked over time and analyzed, portions of the tracked eye movement corresponding to specific patterns may be used to infer that the user is looking at specific types of objects.

Figure 6:
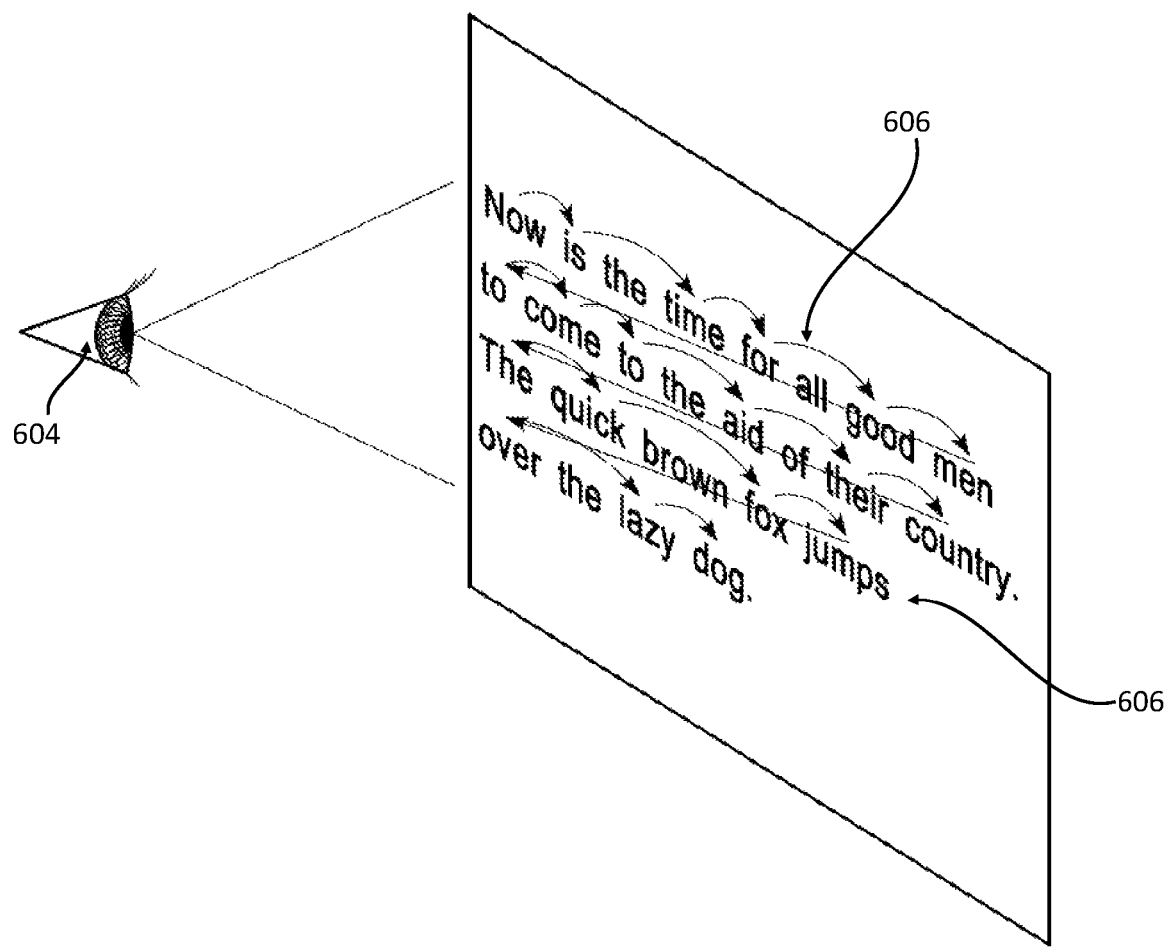
FIG. 6 shows an example of eye movement patterns when reading text, in accordance with some embodiments.

In some embodiments, certain eye movement patterns may be associated with the reading of text. FIG. 6 shows an example of eye movement patterns when reading text, in accordance with some embodiments. As the user reads the text 602, their eye 604 may move in a path 606 corresponding to a series of saccades extending in a horizontal direction along the line of text, which may be identified as a pattern associated with the reading of text. In addition, in cases where the user is reading multiple lines of text, the movement path 606 may comprise multiples series of saccades along the lines of text, wherein each series of saccades is displaced in a vertical direction relative to the remaining series. In some embodiments, each series of saccades may be in a left to right direction. In other embodiments, the predetermined eye movement patterns may correspond to a series of saccades in other directions (e.g., right to left, or vertical), to account for other languages. In some embodiments, a detected eye movement pattern may be cross-referenced with additional information, such as user profile information indicating languages known by the user, a current location of the user, etc., to infer whether or not the user is reading text.

In some embodiments, when the system infers that the user is reading text, based upon a detected eye movement path matching a predetermined eye movement pattern, the eye-mounted device may be used to perform one or more image-processing functions. For example, an imager of the eye-mounted device may be used to capture an image corresponding to at least a portion of a field of view of the user that contains at least a portion of the text being read. The captured image (or a portion thereof) is analyzed (e.g., by an image processing module at a remote server) to identify the captured text within the image.

The identified text may be used to generate supplemental content that is stored and/or presented to the user. For example, in some embodiments, the system determines a language of the identified text. Additional functions may include generating and storing a transcription of the identified text, translating the identified text to a different language (e.g., a preferred language of the user) and presenting the translation to the user (e.g., displayed to the user via the eye-mounted device and/or used to generate audio data that is played to the user), superimposing one or more hyperlinks over portions of the text that may be interacted with by the user to obtain definitions of words of the corresponding portions of text, etc. In some embodiments, the specific action taken regarding the identified text may be based upon one or more user settings (e.g., the server, upon identifying the user's eye movements patching a pattern indicating the reading of text, cross-references the identified movements with one or more user settings to determine a specific context corresponding to actions to be performed by the system).

Contrived Eye Movement Applications

While the above applications primarily involve unconsciously-performed eye movements by the user with viewing different types of objects (e.g., recognizing faces, reading text, etc.), in other embodiments, the system prompts user to perform a contrived eye movement to serve as a fingerprint that triggers an action by the system. In some embodiments, one or more contrived eye movements matching predetermined eye movement patterns may be used to activate certain functionalities of the system. As used herein, a "contrived eye movement" may refer to one or more eye movements that are performed consciously by the user and are unlikely to be performed unconsciously.

Most eye movements performed by a user are saccades. For example, if a user is asked to move their eyes along a particular path (e.g., a straight line, a circle, etc.) without the use of any aids, their eye movements will be in the form of saccades, instead of a smooth path. On the other hand, if of the user is prompted to move their eyes along a path by following a moving object that traces the path, as the user's eyes follows the object, the movement of the user's eye may be in the form of a smooth pursuit instead of a series of saccades. In some embodiments, the path or moving object may be presented to the user as part of a human-engineered setting, such as content displayed on a screen visible to the user. For example, the human-engineered setting is designed to induce a particular eye movement pattern by the user, whereupon the context and subsequent action by the eye-mounted system is based upon the particular pattern.

In some embodiments, the user may move their eyes along a desired path in a smooth motion by tracing the desired path using their finger, and following their finger with their eyes. This enables to the user to perform a smooth pursuit motion with their eyes without the use of displays.

In some embodiments, contrived eye motions may be leveraged by the system to determine a context of the user and perform certain functionalities relating to the determined context. For example, in some embodiments, multiple users may each be associated with a respective eye-mounted device. The eye-mounted devices of each user may be part of different systems, or part of the same system (e.g., each user's eye-mounted device may connect to a common application server). In some embodiments, the system may allow performance of certain functionalities when two or more users are within the same physical area, such as establishing a short-range peer-to-peer (P2P) connection between devices associated with the two or more users, transferring or sharing files between the two or more users, performing image analysis functions such as capturing and recognizing gestures performed by other users, and/or the like.

Figure 7:
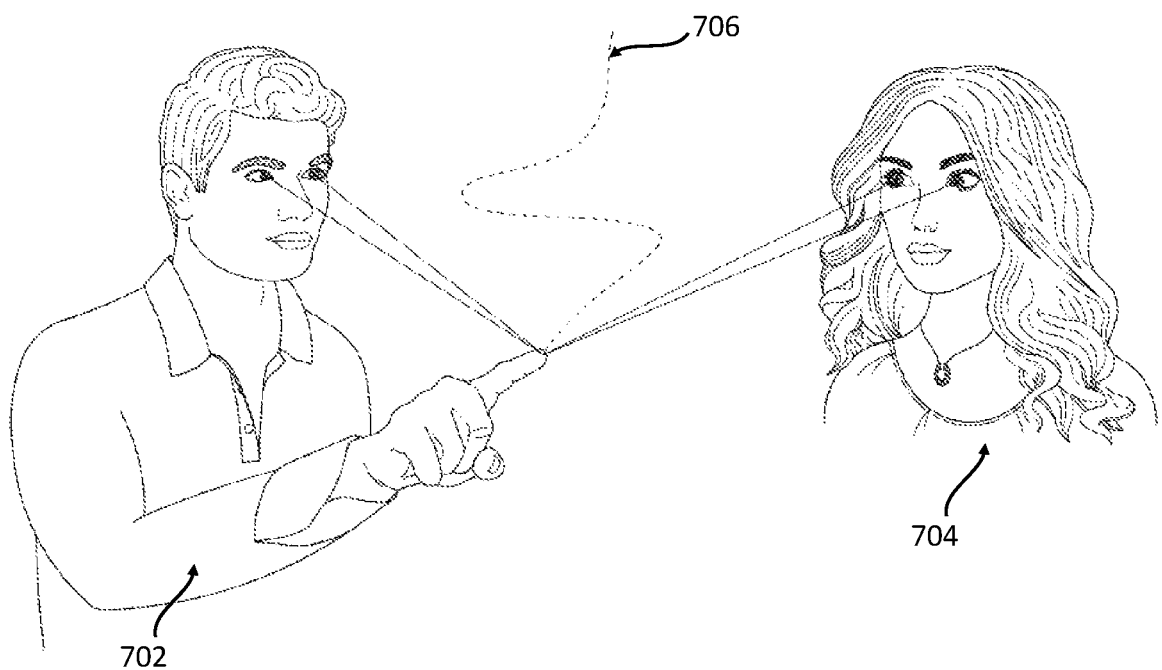
FIG. 7 shows an example of prompting smooth pursuit eye movements for verifying the presence of multiple users within a physical space, in accordance with some embodiments.

FIG. 7 shows an example of prompting smooth pursuit eye movements for verifying the presence of multiple users within a physical area, in accordance with some embodiments. As illustrated in FIG. 7, the first user 702 and the second user 704 are within the same physical area. While location determination functions such as GPS may be able to determine that the users are within the same general area, their margin of error may not be sufficient for verifying that the users are within certain threshold distances of each, such as within the same room, and/or have line of sight to each other. The eye-mounted system may verify that the first and second users 702 and 704 are within the same physical area by tracking eye movements of each of the users, and without needing to use more power intensive image capture and analysis functions.

In some embodiments, the eye-mounted system may verify that the first user 702 and the second user 704 are within the same physical area based on eye tracking data, if both users perform contrived eye movements associated with a common pattern within a threshold period of time. For example, the eye mounted system may prompt the first user 702 to trace a predetermined path (e.g., using their finger or other type of pointer) that is visible to both the first user 702 and the second user 704. In some embodiments, the eye-mounted system prompts the first user 702 by displaying to the first user 702 an image of the predetermined path to be traced via an eye-mounted display worn by the first user 702, or describing the path to be traced via an audio command to the first user 702. In some embodiments, the first user 702 may trace the predetermined path in the air, or on a surface (e.g., a table or wall).

The eye-mounted system receives eye tracking data associated with the second user 704, and determines if the eye movements of the second user 704 are consistent with the path 706 traced by the first user 702. For example, if the eye-mounted system detects a smooth pursuit eye movement by the second user 704 that follows the traced path 706 within a threshold time of path being traced by first user 702 (e.g., a threshold amount of time from when the first user was prompted to trace the path 706), an inference may be made that second user is in the same physical area as the first user 702. In some embodiments, the determination is combined with additional information (e.g., GPS data indicating a location of each user) to infer that the first and second users are within the same physical area. In some embodiments, the eye movement path of the second user 704 may correspond to a transformation of the path 706 traced by first user, due to the relative positions of the first and second users. For example, if the first and second users are standing across from each other, the eye movement path of the second user 704 may correspond to a mirror image of the path 706 traced by the first user 702. In some embodiments, the eye-mounted system may prompt the second user 704 to follow the path traced by the first user 702 with their eyes. Responsive to inferring that the first and second users are within the same physical area, the eye-mounted system may allow for additional functions to be performed.

In some embodiments, the eye mounted system may also detect eye movements of first user 702. For example, as the first user 702 traces the path 706 with their finger, they may also follow the path 706 with their eyes. If both the first user and the second user exhibit eye movements corresponding to the traced path 706 (or a transformation thereof), they may be inferred to be within the same physical area. This may be more accurate in comparison to only analyzing eye movements of the second user 704, as if the first user 702 traces a different path 706 (such as due to human error), the difference may be reflected in the eye movements of both the first and second users. In addition, in some embodiments, by analyzing the eye movements of both users, the first user 702 may trace the path 706 independently of being prompted by the eye-mounted system, facilitating proximity verification for the first and second users on the fly.

In some embodiments, instead of prompting the first user 702 to trace the path 706, the path 706 may be displayed to the first and second users 702 and 704 using an external display, whereupon the first and second users may be inferred to be in the same physical area if both perform eye movements based upon the displayed path within a threshold time of each other.

In some embodiments, the tracked eye movement data of the users may be used with or cross-referenced with additional data, such as GPS location data or other types of sensor data. For example, in some embodiments the eye-mounted system only prompts the first user 702 to trace the path 706 if the first and second users are already determined to be close to each other based upon GPS location data.

In some embodiments, contrived eye movements may be leveraged to allow a user to turn certain functionalities of the system on or off. For example, in some embodiments, the eye-mounted device may display using a femtoprojector one or more user interface elements to the user. The user may be able to manipulate the displayed user interface elements through the use of eye movements. For example, the user may be able to activate or select a displayed user interface element by looking at the user interface element for at least a threshold period of time. The eye-mounted device may determine that the user is looking at a specific UI element by tracking a position of the user's eye, which may be compared to virtual positions of the displayed UI elements. However, in order to save power and/or improve user visibility, the eye-mounted device may not display user interface elements to the user at all times.

As discussed above, smooth pursuit movements are difficult to do without the user's eyes having something to follow. As such, smooth pursuits of certain shapes are unlikely to be performed by users under normal circumstances, and may serve as fingerprints for the device to perform certain functions. In some embodiments, the user of the eye-mounted device may turn certain functions, such as a UI display, on or off by causing the system to detect a smooth pursuit in user's eye motions following a predetermined path. For example, the user traces a predetermined shape (e.g., circle) using their finger, a pointer, etc. The user's eye may perform a smooth pursuit as the user's eyes follow the traced shape. The eye tracker tracks the user's eye position, which is analyzed to identify smooth pursuit corresponding to the traced shape, allowing the system to infer that user wishes to turn the function on or off. In some embodiments, different functions may be associated with different predetermined shapes. By being able to turn different functions (e.g., a UI display) on or off based upon contrived eye movements performed by the user, the eye-mounted device may save power by make certain functionalities available only when needed by the user.

Other Applications

In some embodiments, tracking of user eye movements may be applied to other applications, such as danger detection. Certain eye movement patterns may be indicative of possible imminent danger to the user. As such, when such an eye movement pattern is detected, the eye-mounted system may perform functions to warn the user of possible danger and/or to mitigate the possible danger. For example, a user's eyes may exhibit certain movements when user is fatigued or about to fall asleep. In some embodiments, tracked eye movement data may be cross-referenced with other sensors that are used to determine if the user is currently performing certain actions, such as driving a vehicle (e.g., by measuring a current location/speed of user, through an affirmative indication by user via an interface, determining whether user is currently navigating using a maps application, communication with a system of a vehicle, etc.). If the tracked eye movements of user are indicative of imminent sleep (e.g., the user transitioning from an awake state to an asleep state) while the user is determined to be in a certain state (e.g., driving a vehicle), the system perform certain functions, such as making noise to alert the user and/or request the user to pull over, display a warning light or symbol, etc.

In some embodiments, tracked user eye movements are used to determine if the user is looking at specific content. For example, certain media content may have elements that prompt certain eye movements (e.g., a moving cursor at the beginning of a video that induces a user to perform a smooth pursuit when their eyes follow the cursor). By analyzing the user's eye movements, a determination may be able to be made as whether to user is viewing a specific piece of media content that displayed on an external screen, such as computer screen, video billboard, etc. In some cases, the eye-mounted system may cross-reference the detected eye movement with other information to infer that user viewed the media content. For example, GPS information may indicate that user is in the same area as a video billboard where the content is being displayed. If user is viewing content on a computer, status of computer may indicate that website where content is played is being displayed. In other embodiments, detection of a user eye movement pattern matching a particular piece of content may be used to infer a location or setting of the user (e.g., the location or setting of the content), whereupon the eye-mounted system performs an action based upon the user's presence at the location or setting.

In addition, although the above describes discusses primarily eye tracking using an electronic contact lens, in other embodiments, eye tracking may be performed using other types of devices. For example, in some embodiments, eye tracking may be performed using sensors mounted on a pair of eyeglasses or other head-mounted device worn by the user. In some embodiments, the eyeglasses may function as an accessory device to the electronic contact lens. In other embodiments, the eyeglasses may be used instead of the eye-mounted device, and contain an electronic payload comprising an eye tracker, projector, outward-facing imager, and controller.

The foregoing description of the embodiments of the invention has been presented for the purpose of illustration; it is not intended to be exhaustive or to limit the invention to the precise forms disclosed, but merely illustrates different examples. It should be appreciated that the scope of the disclosure includes other embodiments not discussed in detail above. Persons skilled in the relevant art may appreciate that many modifications and variations are possible in light of the above disclosure, without departing from the spirit and scope as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for taking action in response to a user's context performed by a system comprising an electronic contact lens containing eye tracking sensors and an outward-facing imager, the method comprising:
   collecting, by the eye tracking sensors, eye tracking data while the electronic contact lens is worn on an eye of the user, and while the imager is turned off or run in a low power mode;
   processing the eye tracking data to track eye movements of the user over time;
   detecting a pattern in the user's eye movements corresponding to the user's eye looking at a plurality of different positions in an environment of the user, where the pattern is indicative of the user looking at a particular type of object within the environment of the user; and
   based on the detection of the pattern indicating that the user is looking at the particular type of object, causing performance of a predetermined action comprising activating the imager to capture one or more images of the user's environment containing the object and performing an image processing function corresponding to the type of the object.

2. The method of claim 1, where the pattern in the user's eye movements is indicative that the user is looking at a face.

3. The method of claim 2, where the predetermined action comprises the imager capturing one or more images of the face.

4. The method of claim 3, where the predetermined action further comprises facial recognition to determine an identify of the face.

5. The method of claim 1, where the pattern in the user's eye movements is indicative that the user is reading text.

6. The method of claim 1, where the pattern in the user's eye movements is indicative that the user is looking at the object, wherein the object is predefined within the system, and the predetermined action is responsive to presence of the object in the user's environment.

7. The method of claim 1, where the pattern in the user's eye movements is indicative that the user's context includes possible danger in the user's environment, and the predetermined action comprises at least one of: a warning of the possible danger, and an action to reduce the possible danger.

8. The method of claim 1, where the pattern in the user's eye movements is indicative that the user is located in a setting that is predefined within the system, and the predetermined action is responsive to a presence of the user in the setting.

9. The method of claim 1, where the pattern in the user's eye movements is indicative of a smooth pursuit corresponding to a motion performed by the user.

10. The method of claim 1, where the user's environment is designed by humans to cause a predefined pattern of eye movement;
and the causing the predetermined action is based on the predefined pattern of eye movement.

11. The method of claim 1, where the system contains rules associating predefined patterns for objects with their corresponding predetermined actions, the pattern in the user's eye movements matches one of the predefined patterns, and the causing the predetermined action comprises causing the predetermined action corresponding to the object for the predefined pattern.

12. The method of claim 1, where the causing the predetermined action based on the detection of the pattern comprises:
   determining the user's context as corresponding to what the user is looking at, based on the detection of the pattern; and
   causing the predetermined action based on the determined context.

13. The method of claim 1, where the electronic contact lens also contains a femtoprojector that projects images onto the retina of the user's eye and the predetermined action comprises determining the images to be projected.

14. The method of claim 13, where the pattern in the user's eye movements is indicative that the user is looking at a particular type of content, and the predetermined action comprises the femtoprojector projecting content supplementing the particular type of content.

15. The method of claim 1, where the predetermined action comprises advertising to the user, where the advertising is responsive to the user's context.

16. The method of claim 1, where the predetermined action occurs within the electronic contact lens.

17. The method of claim 1, where the predetermined action occurs outside the electronic contact lens.

18. The method of claim 1, further comprising:
receiving additional sensor data about the user, where the causing the predetermined action is further based on the additional sensor data.

19. The method of claim 18, where the additional sensor data comprises GPS data.

20. A system comprising:
an electronic contract lens comprising:
one or more eye tracking sensors;
an outward-facing imager;
a controller configured to:
receive, from the one or more eye tracking sensors, eye tracking data while the electronic contact lens is worn on an eye of a user, and while the imager is turned off or run in a low power mode;
process the eye tracking data to track eye movements of the user over time;
detect a pattern in the user's eye movements corresponding to the user's eye looking at a plurality of different positions in an environment of the user, where the pattern is indicative of the user looking at a particular type of object within the environment of the user; and
based on the detection of the pattern indicating that the user is looking at the particular type of object, activating the imager to capture one or more images of the user's environment containing the object, and causing performance of an image processing function corresponding to the type of the object.

* * * * *